(12) United States Patent
Olier

(10) Patent No.: US 11,667,768 B2
(45) Date of Patent: Jun. 6, 2023

(54) POLYISOCYANATE COMPOSITIONS

(71) Applicant: VENCOREX FRANCE, Saint-Priest (FR)

(72) Inventor: Philippe Olier, Lyons (FR)

(73) Assignee: VENCOREX FRANCE, Borodine (FR)

( * ) Notice: Subject to any disclaimer, the term of this patent is extended or adjusted under 35 U.S.C. 154(b) by 325 days.

(21) Appl. No.: 16/978,706

(22) PCT Filed: Mar. 5, 2019

(86) PCT No.: PCT/EP2019/055446
§ 371 (c)(1),
(2) Date: Sep. 6, 2020

(87) PCT Pub. No.: WO2019/170674
PCT Pub. Date: Sep. 12, 2019

(65) Prior Publication Data
US 2020/0399439 A1    Dec. 24, 2020

(30) Foreign Application Priority Data
Mar. 6, 2018    (FR) .......................................  1851926

(51) Int. Cl.
| | | |
|---|---|---|
| *C08K 5/524* | (2006.01) | |
| *C09D 7/48* | (2018.01) | |
| *C09D 7/63* | (2018.01) | |
| *C08G 18/24* | (2006.01) | |
| *C08G 18/72* | (2006.01) | |
| *C08K 5/134* | (2006.01) | |
| *C09D 175/04* | (2006.01) | |
| *C09J 11/06* | (2006.01) | |
| *C09J 175/04* | (2006.01) | |

(52) U.S. Cl.
CPC ............ *C08K 5/524* (2013.01); *C08G 18/246* (2013.01); *C08G 18/72* (2013.01); *C08K 5/1345* (2013.01); *C09D 7/48* (2018.01); *C09D 7/63* (2018.01); *C09D 175/04* (2013.01); *C09J 11/06* (2013.01); *C09J 175/04* (2013.01); *C08K 2201/014* (2013.01)

(58) Field of Classification Search
CPC .... C08K 5/524; C08K 5/1345; C08G 18/246; C08G 18/72; C09D 7/63; C09D 7/48; C09D 176/04; C09J 175/04; C09J 11/06
USPC ......................................................... 524/140
See application file for complete search history.

(56) References Cited

U.S. PATENT DOCUMENTS 3,772,218 A * 11/1973 Lamplugh et al. .. C08G 18/161
  521/118
5,258,548 A * 11/1993 Imokawa .............. C07C 263/18
  560/333
2005/0020766 A1    1/2005 Rosen et al.

FOREIGN PATENT DOCUMENTS

| EP | 0 531 803 A2 | 3/1993 |
| WO | 2005/089085 A1 | 9/2005 |

OTHER PUBLICATIONS

International Search Report of the International Searching Authority for PCT/EP2019/055446 dated Apr. 5, 2019.
English translation of International Search Report of the International Searching Authority for PCT/EP2019/055446 dated Apr. 5, 2019.

* cited by examiner

*Primary Examiner* — Hui H Chin
(74) *Attorney, Agent, or Firm* — Dennemeyer & Associates LLC

(57) ABSTRACT

The invention relates to a new polyisocyanate composition for producing coatings, said composition comprising at least one monophenol alkyl compound, a mixture of phosphite compounds for preventing yellowing and/or precipitation of the composition, and optionally, a catalyst.

10 Claims, No Drawings

POLYISOCYANATE COMPOSITIONS

TECHNICAL FIELD

The invention relates to a new composition comprising at least one polyisocyanate, at least one monophenol alkyl compound, a mixture of phosphite compounds and optionally a catalyst for preventing yellowing and/or precipitation of the composition. This composition is intended to be used to manufacture coatings, adhesives or paints.

STATE OF THE ART

Two-component thermosetting polyurethanes are widely used in coatings or protective films in a wide range of applications, such as coatings for automobiles, equipment and other surfaces which require a protective coating. These polyurethanes which can set at ambient temperature are prepared from polyisocyanates and a component which contains an active hydrogen compound, such as a polyol or an amine.

The two-component polyurethane coatings comprise a polyisocyanate component which reacts with a polyol component which comprises, for example, an acrylic polyol or a polyester polyol, to form films. The system also comprises organic solvents and a variety of adjuvant components, for example surfactant agents, pigments, dispersants, thinners and charges. This type of coating is one of the best coatings available which can be produced without using heat or other external energy sources. They are used very often for objects which cannot be thermoset, such as large machines, airplanes, ships and vehicles.

In certain embodiments, two-component polyurethane compositions are set at high temperature. It has been recognized that such systems have a tendency to color at high temperature and processes of prior art to stabilize the color of these polyurethane systems have been developed. The approach in these processes is either the purification or the stabilization of the polyisocyanate. For example, U.S. Pat. No. 4,297,472 teaches the addition of a small quantity of vicinal diols to the formulation to improve the color stability of the polyurethanes.

Other two-component polyurethane systems may be set at relatively gentle temperatures in the presence of a catalyst to favor the reaction of the polyisocyanate with the polyol. In these two-coating polyurethane systems which set at low temperature, the catalyst is included in the system's polyisocyanate component to form a "hardener" component which is then combined with the polyol component to form a coating composition which can set. However, it has been found that including the catalyst in the polyisocyanate component of these systems significantly increases the potential for undesirable coloring of the polyisocyanate and the associated coating.

U.S. Pat. No. 7,297,746 teaches in particular that adding a stabilizer may limit or even prevent the appearance of coloring on a composition that comprises an isocyanate in the presence of a catalyst for the reaction of the isocyanate with an active hydrogen component. Nevertheless, it has since been observed that when the composition comprises a low quantity of catalyst, the composition has a tendency not to color but to precipitate.

In non-catalyzed systems, an identical precipitation problem is known as taught by literature and water binding agents may in particular be used in polyisocyanate compositions to avoid precipitation. This stabilization covers among other elements the prevention of flocculation of aliphatic polyisocyanates in diluted form in solvents such as those used for applying coatings. Patent US2013109793 teaches that in non-catalyzed systems, the addition of additives, such as organic acids with a pKa lower than 4.2, may prevent the precipitation of polyisocyanate compositions.

Literature highlights two major problems in polyisocyanates compositions: a coloration problem in catalyzed systems and a precipitation problem in non-catalyzed or low-catalyzed systems. This makes the use of these compositions complex as it is necessary to add very specific and different additives to them according to the final use required for the composition.

There is therefore a real need to have a unique composition which can be used in catalyzed or non-catalyzed systems without having the problems related to these different systems, such as the coloration and precipitation problems.

DISCLOSURE OF THE INVENTION

To this end, the inventors have developed a new polyisocyanate composition which contains at least one isocyanate, at least one monophenol alkyl compound and at least one mixture of phosphite compounds.

The composition of the invention enables thanks to a mixture of phosphite compounds the yellowing of the composition to be avoided if one or more cross-linking catalysts are added and enables the precipitation of the composition to be avoided if the cross-linking is non-catalyzed or low-catalyzed. This composition may be considered as universal in the sense that it may be used as such in the configurations of catalyzed or non-catalyzed systems.

In fact, the inventors demonstrate in a surprising way that if a specific rate of trialkyl phosphite is added to a polyisocyanate composition, then this stabilizes the composition and prevents precipitation in a non-catalyzed system or yellowing if a catalyst is added.

One of the objects of the invention is a composition comprising:
a) at least one polyisocyanate with the general formula (I): $O=C=N-Y-(N=C=O)_n$ in which:
   Y is the remainder of an isocyanate or a polyisocyanate after elimination of an isocyanate function and
   n is at least equal to 1,
b) at least one monophenol alkyl compound,
c) a mixture of phosphite compounds comprising a maximum of 17% of trialkyl phosphite moles in relation to the number of total phosphite moles,
d) optionally at least one cross-linking catalyst and
e) optionally one or more additives.

The polyisocyanates according to the invention may be polyisocyanates or prepolymers with at least one NCO group.

In the general formula (I): Y represents the remainder of an isocyanate or a polyisocyanate, advantageously the remainder of a reaction product of a diisocyanate monomer with itself to form a polyisocyanate or the remainder of a reaction product of a diisocyanate monomer with a compound comprising an active hydrogen to form biuret, allophanate or urethane structures or a mixture of these structures.

We consider for example as a compound comprising a viable active hydrogen, a mono, a di- or a poly-ol. Advantageously, the polyol is a triol or a tetra-ol.

In particular, the polyisocyanates have the general formula (I): $O=C=N-Y-(N=C=O)_n$ in which:
   Y is an aromatic, aliphatic, araliphatic, heterocyclic or cycloaliphatic group and,
   n is at least equal to 1.

Preferably, in the general formula (I): Y is a group: aryl comprising 6 to atoms of carbon, heteroaryl comprising 5 to 15 members, linear or branched alkyl comprising 2 to 15 atoms of carbon, araliphatic comprising 6 to 15 atoms of carbon, heterocycle comprising 3 to 15 members or cycloalkyl comprising 3 to 15 atoms of carbon, preferentially aryl comprising 6 to 12 atoms of carbon, heteroaryl comprising 5 to 12 members, linear or branched alkyl comprising 2 to 12 atoms of carbon, araliphatic comprising 6 to 12 atoms of carbon, heterocycle comprising 3 to 12 members or cycloalkyl comprising 3 to 12 atoms of carbon, preferably aryl comprising 6 to 10 atoms of carbon, heteroaryl comprising 5 to 10 members, linear or branched alkyl comprising 4 to 10 atoms of carbon, araliphatic comprising 4 to 10 atoms of carbon, heterocycle comprising 4 to 10 members or cycloalkyl comprising 4 to 10 atoms of carbon.

Preferably, in the general formula (I): n is between 1 and 10, preferentially between 1 and 7, preferentially between 2 and 5.

The polyisocyanate(s) which may be used in accordance with the invention may be used on their own or in a mixture, such as mixtures from a commercial composition.

The polyisocyanates in accordance with the invention are compounds formed from at least two isocyanate monomers, which may be different, such as polyisocyanate dimers, polyisocyanate trimers or any other product of the condensation of two or more polyisocyanates.

In particular, the polyisocyanates in accordance with the invention are aliphatic, araliphatic or (cyclo)aliphatic polyisocyanates, such as those derived from isophorone diisocyanate, ethylene diisocyanate, tetramethylene diisocyanate, hexamethylene diisocyanate, decamethylene diisocyanate, pentamethylene diisocyanate or norbornene diisocyanate.

We may quote as examples of polyisocyanates in accordance with the invention 2,4,6-trioxo-hexahydro-1, 3,5-triazine, 6-imino-5-oxa-1,3-diazine-2,4-dione, 6-imino1,3,5-triazine-2,4-dione, 5-oxa-1,3-diazine2,4,6-trione, uretidine-2,4-dione, 4-imino-2-oxo-1,3-diazetidine, or urethane or ester compounds of carbamic acid, allophanate, urea, acyl urea, biuret and carbodiimide compounds.

For example, we may quote as isocyanate usable to produce a polyisocyanate in accordance with the invention, on their own or in a mixture and in any format isophorone diisocyanate, 1,3- and 1,4-cyclohexane diisocyanate, 1,4-tetramethylene diisocyanate, 1,5-pentamethylenediisocyanate, 1,6-hexamethylene diisocyanate, 2-methyl-1,5-pentanediisocyanate, 2-ethyl-1,4-diisocyanate, 2,2,4 and 2,4,4-trimethyl-1,6-hexamethylene diisocyanate, 1,12-dodecane diisocyanate, alpha,alpha'-diisocyanatodipropyl ether, 1,3-cyclobutane diisocyanate, 2,2 and 2,6-diisocynanato-1-methylcyclohexane, 2,5 and 3,5-bis(isocyanatomethyl)-8-methyl-1,4-methano-decahydronaphthalene, 1,5-, 2,5-, 1,6- and 2,6-bis(isocyanatomethyl)-4,7-methanohexahydroindane, 1,5-, 2,5 and 2,6-bis (isocyanato)-4,7-methanehexahydroindane, 2,4' and 4,4'-dicylohexyl diisocyanate, 2,4- and 2,6-hexahydrotolylene diisocyanate, perhydro-2,4'- and 4,4'-diphenylmethane diisocyanate, alpha,alpha'-diisocyanato-1,4-diethylbenzene, 1,3- and 1,4-phenylene diisocyanate, 4,4' diisocyanatobiphenyl, 4,4'-diisocyanato-3,3' dimethoxybiphenyl, 4,4'-diisocyanato-3,3' dimethylbiphenyl, 4,4'-diisocyanato-3,3'-diphenylbiphenyl, 2,4'- and 4,4'-diisocyanato diphenylmethane, naphthylene 1,5-diisocyanate, 2,4- and 2,6-tolylene diisocyanate, N,N'(4,4'-dimethyl-3,3'-diisocyanatodiphenyl)uretdione, m-xylylene diisocyanate, dicyclohexylmethane diisocyanate, tetramethylxylylene diisocyanate, 2,4,4'-triisocyanatodiphenylether, lysine diisocyanate or lysine triisocyanate, 4,4',4''-triisocyanatotriphenylmethane, and bis-isocyanatomethyl-cyclohexane.

Preferably, the monophenol alkyl compound comprises at least one hindered phenol or hindered thiophenol function.

Hindered phenol or hindered thiophenol means any phenol or thiophenol compound which comprises at least one substitute linked to the aromatic cycle by a quaternary carbon.

Preferably, the monophenol alkyl compound comprises at least one phenol function hindered by a mono- or di-ortho-tert-butyl or a least one thiophenol function hindered by a mono- or di-ortho-tert-butyl.

For example, and without being limiting, we may quote as monophenol alkyl compounds that may be used on their own or in a mixture 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-di-tert-butyl-4-secbutylphenol, 2,6-di-tert-butyl-4-nonylphenol, 2,6-dicyclopentyl-4-methylphenol, 2-($\alpha$-methylcyclohexyl)-4,6-dimethylphenol, 2,6-dioctadecyl-4-methylphenol, 2,4,6-tricyclohexylphenol, 2,6-di-tert-butyl-4-methoxymethylphenol, linear or branched nonylphenol, for example, 2,6-di-nonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol, a compound registered un the number CAS No. 6683-19-8, CAS No. 36443-68-2, CAS No. 125643-61-0, CAS No. 2082-79-3, CAS No. 1827-68-1, CAS No. 125643-61-0, CAS No. 68411-46-1.

Preferably, the monophenol alkyl compound is a compound registered under the number CAS No. 6683-19-8, CAS No. 36443-68-2, CAS No. 125643-61-0, CAS No. 2082-79-3, CAS No. 1827-68-1, CAS No. 125643-61-0, CAS No. 68411-46-1 or their mixtures.

The mixture of phosphite compounds is defined as a percentage of the trialkyl phosphite moles in relation to the total phosphite moles, hereafter designated as the phosphite percentage.

The mixture of phosphite comprises between 0% and 17% maximum of trialkyl phosphite moles in relation to the total phosphite moles present in the phosphite mixture.

Preferably, the phosphite percentage is between 0.1% and 15% in moles in relation to the total phosphite moles present in the phosphite mixture.

In the present invention, the trialkyl phosphites that may be used are compounds according to the general formula (II): $(R_1O)_3P$ in which each $R_1$ independently represents an alkyl group of 1 to 20 atoms of carbon optionally substituted by a group containing a halogen or an aralkyl group of 5 to 20 atoms of carbon optionally substituted by a group containing a halogen.

For example, the different phosphite mixtures may comprise trialkyl phosphites, triaryl phosphites and alkylaryl phosphites.

The term "halogen" designates an atom of halogen chosen from chlorine, bromine, iodine or fluorine.

The term "alkyl" here designates linear or branched saturated alkyls comprising 1 to 15 atoms of carbon, preferably 2 to 15 atoms of carbon, more preferably 2 to 12 atoms of carbon, for example 4 to 10 atoms of carbon. The alkyl may be substituted by one or more cycloalkyl groups, these cycloalkyl groups may potentially be substituted by linear or branched cycloalkyl chains, these branched alkyl chains may be substituted by alkyl or cycloalkyl groups.

The term "aryl" here designates, except where indicated to the contrary, an aromatic mono- or polycyclical cycle comprising 6 to 20 atoms of carbon, preferably 6 to 12 atoms of carbon, for example 6 to 10 atoms of carbon. The aryl may potentially be independently substituted by a group chosen from phenyl, naphtyl, methylphenyl, dimethoxyphenyl, 5-isopropyl-2-methylphenyl, methylphenyl, t-butylphenyl and nonylphenyl.

The term "heteroaryl" here designates, except where indicated to the contrary, an aromatic mono- or polycyclical cycle comprising 5 to 20 members, preferably 5 to 12 members, preferably 5 to 10 members, including at least one heteroatom chosen from O, N or S, preferably including 1 to 3 heteroatoms chosen from O, N or S.

The term "aralkyl" designates here a compound containing one or more alkyl chains linked to an aryl group or one or more aryl groups linked to an alkyl group.

The term "heterocycle" here designates, except where indicated to the contrary, a mono- or polycyclical cycle comprising 3 to 20 members, preferably to 12 members, including at least one heteroatom chosen from O, N or S, preferably, one, two or three heteroatoms chosen from O, N or S.

The term "araliphatic" here designates, except where indicated to the contrary, an aliphatic compound, particularly an alkyl group, containing one or more aryl groups, particularly an alkyl-aryl group.

The term "cycloalkyl" here designates, except where indicated to the contrary, a mono- or polycyclical cycle comprising 3 to 20 members, preferably to 12 members, including at least one heteroatom chosen from O, N or S, preferably, one, two or three heteroatoms chosen from O, N or S. The cycloalkyls may be substituted particularly by alkyl groups.

The term alkaryl here designates, except where indicated to the contrary, an alkyl-aryl group.

The term aralkyl here designates, except where indicated to the contrary, an aryl-alkyl group.

For example, and without being limiting, we may quote as phosphite that can be used in the invention tri(ethyl)phosphite, tri(butyl)phosphite, tri(octyl)phosphite, tri(phenyl) phosphite, tri(nonylphenyl)phosphite, tri(butyltripentyl) phosphite tri(2,4-di-t-butyl)phosphite, triisodecyl phosphite, triphenyl phosphite, diphenylalkyl phosphites, phenyldialkyl phosphites, tri(nonylphenyl) phosphite, trilauryl phosphite, trioctadecyl phosphite, diphenyldecylphosphite, diphenyl(tridecyl)phosphite, di-, tri-, or tetraphosphites derived from polyols such as distearylpentaerythritol diphosphite, tri(2,4-di-tert-butylphenyl) phosphite, diisodecyl pentaerythritol diphosphite, bis(2,4-di-tert-butylphenyl)pentaerythritol diphosphite, bis(2,4-dicumylphenyl) pentaerythritol diphosphite, bis(2,6-di-tert-butyl-4-methylphenyl)pentaerythritol diphosphite, diisodecyloxypentaerythritol diphosphite, bis(2,4-di-tert-butyl-6-methylphenyl)-pentaerythrito diphosphite,bis(2,4,6-tri(tert-butylphenyl)pentaerythritol diphosphite, tristearyl sorbitol triphosphite, tetrakis(2,4-ditert-butylphenyl) 4,4'-biphenylene diphosphonite, 6-isooctyloxy-2,4,8,10-tetra-tert-butyl-12H-dibenz[d,g]-1,3,2-dioxaphosphocine, bis(2, 4-di-tert-butyl-6-methylphenyl)methyl phosphite, bis(2,4-di-tert-butyl-6-methylphenyl)ethylphosphite, 6-fluoro-2,4, 8,10-tetra-tert-butyl-12-methyl-dibenz[d,g]-1,3,2-dioxaphosphocine, 2,2',2"-nitrilo-[triethyltris(3,3',5,5'-tetra-tert-butyl-1,1'-biphenyl-2,2'-diyl)phosphite], 2-ethylhexyl (3,3',5,5'-tetra-tert-butyl-1,1'-biphenyl-2,2'-diyl)phosphite, 5-butyl-5-ethyl-2-(2,4,6-tri-tert-butylphenoxy)-1,3,2-dioxaphosphirane diphosphites derived from bisphenol compounds, such as C1-20 di-alkyl-bisphenol A-diphosphites and 4,4'-butylidene-bis(3-methyl-6-t-butylphenyl-di-tridecyl) phosphite, polyphosphites such as hydrogeneted phosphite bisphenol A polymers and tris(1,3-dichloropropyl)phosphite According to the invention, the composition may comprise the addition of at least one cross-linking catalyst which catalyzes the reaction of the isocyanate functions of the polyisocyanates with a compound which has an active hydrogen (thereby enabling the cross-linking of the composition). The compound which has an active hydrogen may be chosen from all the compounds known to the person skilled in the art comprising a reactive hydrogen atom, particularly for cross-linking with the isocyanate functions of the polyisocyanates, such as alcohols in particular.

Examples of these catalysts may be tertiary amines, amidines, organo-metallic compounds or their mixtures.

The appropriate amine catalysts may be acyclical or cyclical compounds, such as triethylenediamine, tetramethyl butanediamine, 1,4-diazabicyclooctane (DABCO), 1,8-diazabicyclo-(5.4.0)-undecene, N, N-dimethylcyclohexylamine, and N, N-dimethylethanolamine, and their mixtures. The appropriate organo-metallic catalysts may be organotin, organozinc, organobismuth and organozirconium catalysts, and their mixtures.

Preferably, the catalysts used are organotin. The organotin compounds are compounds which contain both tin and an organic compound, more particularly compounds which contain one or more Sn—C links. The organic compounds in the broad sense also contain, for example, salts such as tin octoate (II) and tin stearate (II). The tin compounds in the strict sense comprise above all tetravalent tin compounds which meet the general formula (III): $R^2_n+1SnX_{3-n}$, where n is a number from 0 to 2, $R^2$ is an alkyl, aryl, an alkaryl and/or aralkyl group an X is a compound comprising oxygen, sulfur or nitrogen. The $R^2$ and X groups may also form a cycle with the tin. These compounds are described in patents EP 491 268, EP 490 277 and EP 423 643. $R^2$ contains at least 4 atoms of carbon and more particularly at least 8 atoms of carbon and up to 12 atoms of carbon.

In a preferred embodiment, in the general formula (III), n=0 or 1. X is a compound which comprises oxygen such as an organotin oxide, a hydroxide, an alcoholate, a beta-dicarbonyl compound, a carboxylate or an inorganic acid ester. X may also be a compound comprising sulfur, i.e. an organotin sulfur, a thiolate or a thioacid ester. Among the Sn—S compounds, we can quote thioglycolic esters, for example, the compounds which contain the following groups: —S—CH2-CH2-CO—O—(CH2) 10-CH3 or —S—CH2-CH2-CO—O—CH2-CH—(C2H5)-CH2-CH2-CH2-CH3. Preferably, the molecular weight of the organotin compound is greater than 400 and more particularly greater than 250.

One preferred class of catalysts is dialkyltin carboxylates. In one embodiment, the catalyst comprises a dialkyltin dicarboxylate, in which the alkyl groups of the dialkyltin dicarboxylate are each selected independently from the alkyl groups which contain 1 to 12 atoms of carbon per group and the carboxylate groups of the dialkyltin dicarboxylate are each carboxylate groups which contain 2 to 32 atoms of carbon per group.

For example, and without being limiting, we may quote as catalysts which may be used in the invention the following acids: adipic acid, maleic acid, fumaric acid, malonic acid, succinic acid, heptanedioic acid, terephthalic acid, phenylacetic acid, benzoic acid, acetic acid, propionic acid and, in particular, 2-ethylhexanoic acid, caprylic acid, capric acid, lauric acid, myristic acid, palmitic acid and stearic acid. Specific dialyltin carboxylates comprise dibutyltin diacetate, dioctyltin diacetate, dibutyltin maleate, bis-(2-dibutyltin ethylhexoate), dibutyltin dilaurate; tributyltin acetate, tin bis-(beta-methoxycarbonylethyl) dilaurate and tin bis-(beta-acetylethyl) dilaurate.

Tin oxides, sulfurs and thiolates may also be used. In particular, we may quote bis-(tributyltin) oxide, bis-(trioctyltin) oxide, dibutyl and dioctyltin-bis-(2-ethylhexylthiolate), dibutyl and dioctyltin didodecylthiolate, bis-(beta-methoxycarbonylethyl)-dine didodecyle thiolate, bis-(beta-acetyl ethyl)-tin-bis-(2-ethyl hexyl thiolate), dibutyl and dioctyl tin didodecyl thiolate, butyl and octyl tin tris (thioglycolic-2-ethylhexoate acid), dibutyl and dioctyltin-bis-(thioglycolic-2-ethyl hexoate acid), tributyl and trioctyltin-(thioglycolic-2-ethylhexoate acid) and butyl and octyltin tris-(thioethyleneglycol-2-ethylhexoate), dibutyl and dioctyl tin-bis-(thioethyleneglycol-2-ethyl hexoate), tributyl and trioctyltin-(thioethyleneglycol-2-ethyl hexoate) of the general formula Rn+1Sn (SCH2CH·2OCOC8H17) 3-n, where R is a C4-8 alkyl group, bis-(beta-methoxycarbonylethyl)-tin-bis-(thioethylene glycol-2-ethylhexoate), -tin-bis-(thioglycolic-2-ethyl hexoate acid) and bis-(beta-acetyl ethyl)-tin-bis-(thioethylene glycol-2-ethyl hexoate e) and -tin-bis-(thioglycolic-2-ethylhexoate acid). We may also quote other tin catalysts such as tributyltin hydroxide, dibutyltin diethylate, dibutyltin dibutylate, dihexyltin dihexylate, dibutyltin diacetylacetonate, diethylacetyl dibutyltin acetate, bis-(butyl dichlorotin) oxide, bis-(dibutylchlorotin)-sulfur, dibutyl and dioctyl tin dichloride, dibutyl- and dioctyl tin dithioacetate.

In one embodiment, the composition according to the invention comprises a catalystically effective quantity of catalyst. Polyurethane catalysts are widely known to the person skilled in the art, who is therefore able to adapt the right quantity of catalyst to the reaction they want to produce. Nevertheless, in the context of the invention, we consider that the term "catalystically effective quantity" signifies a sub-stoechiometric quantity of catalyst in relation to a reagent. As used here, a catalystically effective quantity is typically around 10 to around 5000 parts by weight ("ppm") of catalyst for 1 000 000 of polyisocyanate, more specifically around 100 to around 2500 parts by weight of catalyst for 1 000 000 of polyisocyanate.

The compositions of the invention comprise compounds in the following mass percentages.

General formula (I) polyisocyanate between 97.9% and 99.98%,
Monophenol alkyl compound between 0.01% and 1%, preferably 0.01% and 0.5%,
Phosphite compound mixture 0.01% and 1%
Cross-linking catalyst between 0% and 0.1%

In a specific embodiment, it is possible to add to the composition of the invention one or more additives such as solvents, compounds with an anti-flocculant effect and/or humidity absorbers such as para toluene sulfonyl isocyanate, an orthoformate or silyl compounds.

As compounds which have an anti-flocculant effect, we may quote aromatic sulfionic acids such as benzenesulfonic acid, para-toluenesulfonic acid, para-ethylbenzenesulfonic acid, dodecylbenzenesulfonic acid, bisnonylnaphtalenesulfonic acid, bisnonylnaphthalenebissulfonic acid, bisdodecylnaphtalenesulfonic acid; alkenedicarboxylic acids such a maleic acid and fumaric acid, phosphoric alkyl acids or alkanedicarboxylic acids such as 3-chloropropionic acid and 2-chloropropionic acid.

Different solvents may be used on their own or in a mixture. We may quote as solvents (cyclo)aliphatic hydrocarbons such as decalin, alkylated decalin and mixtures of linear or branched alkane and/or cycloalkane isomers. Along with the esters, for example, n-butyl acetate, ethyl acetate, 1-methoxyprop-2-yle acetate and 2-methoxyethyl acetate and ethers, for example, THF, dioxane, and dimethyl, diethyl or di-n-butylicesters of ethyleneglycol, diethyleneglycol, triethyleneglycol, propyleneglycol, dipropyleneglycol, tripropyleneglycol, n-butyl glycol acetate, or propylene glycol diacetate.

Ketones are also compounds which may be used as solvents, such as acetone, diethyl ketone, methyl ethyl ketone, isobutyl methyl ketone, methyl amyl ketone and tert-butyl methyl ketone.

In compositions which contain a solvent as additive, the mass percentage of the solvent in the composition according to the invention is between 10% and 80%, preferably between 20 and 80%, preferably between 70% and 30%, preferably between 40% and 60%.

One other object of the invention concerns a polyisocyanate composition preparation process in which the following compounds are mixed in any order:

a) at least one polyisocyanate with the general formula (I): $O=C=N-Y-(N=C=O)_n$ in which:
  Y is the remainder of an isocyanate or a polyisocyanate after elimination of an isocyanate function and
  n is at least equal to 1,
b) at least one monophenol alkyl compound,
c) a mixture of phosphite compounds comprising a maximum of 17% of trialkyl phosphite moles in relation to the total phosphite moles,
d) optionally at least one cross-linking catalyst and
e) optionally one or more additives.

The compositions of the invention comprise compounds in the following mass percentages.

general formula (I) polyisocyanate between 20 and 98%, preferably between 20% and 90%, preferably between 70% and 30%, preferably between 40% and 60%
Monophenol alkyl compound between 0.01% and 1%, preferably between 0.01% and 0.5%,
Phosphite compound mixture 0.01% and 1%
Cross-linking catalyst between 0% and 0.05%, preferably between 0% and 0.1%
Additives between 9.98% and 77.9%, preferably between 20 and 77.9%, preferably between 30% and 70%, preferably between 40% and 60%.

The person skilled in the art will adapt the share of each compound according to the type of composition they want to produce, with the sum of the percentages making 100%.

In general, the polyisocyanate composition preparation process is carried out at a temperature between 0° C. and 150° C., preferably between 10° C. and 80° C., preferably between 20° C. and 50° C.

One other object of the invention is the use of the polyisocyanate compositions of the invention to prepare coatings.

The compositions according to the invention may be used to manufacture adhesives, to manufacture paints or to manufacture coatings including interior or exterior coatings, more specifically in coatings where there is exposure to daylight, preferably parts of buildings, vehicle and airplane coatings, decorative coatings, bridges, buildings, electrical pylons, tanks, containers, pipelines, electricity power stations, corridors, roofs and steel structures, furniture, windows, doors, wooden floors, can coatings and reel coatings, for floor coverings, such as in car parks.

The invention is not limited to the production examples described. For example, other polyisocyanates, monophenol alkyl, mixture of phosphite compounds or cross-linking catalyst may be used to produce a composition according to the invention.

Several embodiments presented may be combined in the same process. The person skilled in the art is able to identify the embodiments which may be combined.

EXAMPLE 1: GENERAL EXAMPLE

Different commercial products are used in order to produce the compositions described in the examples:
- Tolonate® HDT from Vencorex, with viscosity equal to 2400 mPa·s at 25° C. and NCO titer equal to 22.5%
- Irganox 1135 ®: Benzenepropanoic acid, branched 3,5-bis (1,1-dimethyl-ethyl) 4-hydroxy-C7-C9 alkyl ester from BASF
- Doverphos 6 ® (Dov 6): triisodecyl phosphite from Dover
- Doverphos 7 ® (Dov 7): phenyldiisodecyl phosphite from Dover
- Doverphos 8 ® (Dov 8): diphenylisodecyl phosphite from Dover
- ADEKA 135A®: diphenylisodecyl phosphite from Adeka Palmerole The molar distribution of the phosphite, determined by phosphorous NMR, is presented in TABLE 1.

TABLE 1

|  | Tri-isodecyl phosphite | Diphenyl-isodecyl phosphite | Phenyl-diisodecyl phosphite | Tri-phenyl phosphite |
|---|---|---|---|---|
| ADK 135A ® | 2.8 | 18 | 56.9 | 22.4 |
| Dov 8 | 1.5 | 21.7 | 54.7 | 22 |
| Dov 7 | 24.6 | 53.5 | 20.4 | 1.5 |
| Dov 6 | 94.3 | 5.61 | 0.11 | 0 |

EXAMPLE 2: PRODUCTION OF POLYISOCYANATE COMPOSITIONS

The compositions A to I are prepared as follows from the commercial products described in example 1:

Different compounds are added to a 250 ml vial according to the polyisocyanate composition to be produced and the mixture is left one night in agitation on a pot roller at ambient temperature.

The mass proportions of the different compounds present in the polyisocyanate compositions A to I are presented in TABLE 2.

TABLE 2

|  | Tolonate HDT ® (g) | Irganox 1135 ® (g) | Dov 6 (g) | Dov 7 (g) | Dov 8 (g) | ADK 135 A ® (g) |
|---|---|---|---|---|---|---|
| Composition A | 100 | / | / | / | / | / |
| Composition B | 100 | 0.34 | / | / | 0.76 | / |
| Composition C | 100 | 0.34 | / | / | / | 0.76 |
| Composition D | 100 | 0.34 | 0.038 | / | / | 0.722 |
| Composition E | 100 | 0.34 | 0.076 | / | / | 0.684 |
| Composition F | 100 | 0.34 | 0.114 | / | / | 0.646 |
| Composition G (comparative) | 100 | 0.34 | 0.152 | / | / | 0.608 |
| Composition H (comparative) | 100 | 0.34 | / | 0.76 | / | / |
| Composition I (comparative) | 100 | 0.34 | 0.76 | / | / | / |

EXAMPLE 3: COLORATION TEST

In order to carry out the coloration tests, the same compositions as those in example 2 are produced in order to have different polyisocyanate compositions. From compositions A to I, compositions 1 to 9 are produced, adding and mixing different products in a 125 ml vial and leaving on a pot roller for one night to homogenize these new compositions produced.

Once compositions 1 to 9 have been homogenized, the initial coloration value is measured using a Minolta CM-5 spectrophotometer. The coloration value is expressed in Hazen.

In order to verify a coloration variability, compositions 1 to 9 are placed in the oven at 90° C. for 5 days then cooled down for one day and the coloration is measured again under the same conditions as the initial coloration measurement. We may then easily compare a coloration variation over time.

The mass proportions of the different compounds present in compositions 1 to 9 are presented in TABLE 3.

TABLE 3

| Compositions | 1 | 2 | 3 | 4 | 5 | 6 | 7 | 8 | 9 |
|---|---|---|---|---|---|---|---|---|---|
| Butyl acetate | 24.3 | 24.3 | 24.3 | 24.3 | 24.3 | 24.3 | 24.3 | 24.3 | 24.3 |
| Solvesso 100 | 11.4 | 11.4 | 11.4 | 11.4 | 11.4 | 11.4 | 11.4 | 11.4 | 11.4 |

TABLE 3-continued

| Compositions | 1 | 2 | 3 | 4 | 5 | 6 | 7 | 8 | 9 |
|---|---|---|---|---|---|---|---|---|---|
| Methoxypropyl acetate | 2.5 | 2.5 | 2.5 | 2.5 | 2.5 | 2.5 | 2.5 | 2.5 | 2.5 |
| Xylene | 8 | 8 | 8 | 8 | 8 | 8 | 8 | 8 | 8 |
| Dibutyl tin dilaurate (10% in butyl acetate) | 0.5 | 0.5 | 0.5 | 0.5 | 0.5 | 0.5 | 0.5 | 0.5 | 0.5 |
| Composition A | 53.3 | / | / | / | / | / | / | / | / |
| Composition B | / | 53.3 | / | / | / | / | / | / | / |
| Composition C | / | / | 53.3 | / | / | / | / | / | / |
| Composition D | / | / | / | 53.3 | / | / | / | / | / |
| Composition E | / | / | / | / | 53.3 | / | / | / | / |
| Composition F | / | / | / | / | / | 53.3 | / | / | / |
| Composition G | / | / | / | / | / | / | 53.3 | / | / |
| Composition H | / | / | / | / | / | / | / | 53.3 | / |
| Composition I | / | / | / | / | / | / | / | / | 53.3 |

The initial coloration values (in Hazen) and the values after 5 days for compositions 1 to 9 are presented in TABLE 4.

TABLE 4

| Compositions | 1 | 2 | 3 | 4 | 5 | 6 | 7 | 8 | 9 |
|---|---|---|---|---|---|---|---|---|---|
| Initial coloration | 3 | 3 | 3 | 3 | 3 | 3 | 3 | 3 | 3 |
| Coloration after 5 days | 167 | 21 | 26 | 22 | 20 | 20 | 19 | 19 | 20 |

The coloration of composition 1 which is the composition containing the Tolonate HDT® alone increases significantly after 5 days. On the contrary, the other compositions 2 to 9 which comprise both the irganox 1135 and at least one phosphite only show a slight change in coloration. In fact, a variation in coloration which exceeds 50 Hazen would be considered as true discoloration. We may therefore conclude that the nature of the phosphite used has no influence on the Hazen coloration value after 5 days.

EXAMPLE 4: PRECIPITATION TEST

In order to verify whether the different compositions precipitate, compositions A to I are produced as in example 3 then are placed in the oven at 50° C. for 7 days. Compositions 10 to 18 are then produced from compositions A to I in the oven, mixing different products in a 125 ml vial and leaving on a pot roller for one night to homogenize these new compositions produced. Compositions 10 to 18 are then transferred to turbidity measurement tubes for HACH ratio turbidimeter.

The mass proportions of the different compounds present in compositions 10 to 18 are presented in TABLE 5. Compositions 16 to 18 are comparative compositions.

TABLE 5

| Compositions | 10 | 11 | 12 | 13 | 14 | 15 | 16 | 17 | 18 |
|---|---|---|---|---|---|---|---|---|---|
| Butyl acetate | 38.1 | 24.3 | 24.3 | 24.3 | 24.3 | 24.3 | 24.3 | 24.3 | 24.3 |
| Solvesso 100 ® | 18.5 | 11.4 | 11.4 | 11.4 | 11.4 | 11.4 | 11.4 | 11.4 | 11.4 |
| Glycol butyl acetate | 11.4 | 2.5 | 2.5 | 2.5 | 2.5 | 2.5 | 2.5 | 2.5 | 2.5 |
| Composition A | 32 | / | / | / | / | / | / | / | / |
| Composition B | / | 32 | / | / | / | / | / | / | / |
| Composition C | / | / | 32 | / | / | / | / | / | / |
| Composition D | / | / | / | 32 | / | / | / | / | / |
| Composition E | / | / | / | / | 32 | / | / | / | / |
| Composition F | / | / | / | / | / | 32 | / | / | / |
| Composition G (comparative) | / | / | / | / | / | / | 32 | / | / |
| Composition H (comparative) | / | / | / | / | / | / | / | 32 | / |
| Composition I (comparative) | / | / | / | / | / | / | / | / | 32 |

In order to be able to carry out turbidity measurements at regular intervals, the initial turbidity is measured then the measurement tubes for compositions 10 to 18 are put back into the oven at 50° C. and the turbidity (expressed in NTU) is read after 1, 4 and 7 days. The results of the turbidity measurements in compositions 10 to 18 are presented in TABLE 6.

TABLE 6

| Composition | 10 | 11 | 12 | 13 | 14 | 15 | 16 | 17 | 18 |
|---|---|---|---|---|---|---|---|---|---|
| Initial turbidity (NTU) | 0.17 | 0.2 | 0.23 | 0.25 | 0.25 | 0.28 | 0.32 | 0.17 | 0.32 |

TABLE 6-continued

| Composition | 10 | 11 | 12 | 13 | 14 | 15 | 16 | 17 | 18 |
|---|---|---|---|---|---|---|---|---|---|
| Turbidity after 1 day at 50° C. (NTU) | 0.17 | 0.2 | 0.28 | 0.32 | 0.32 | 0.35 | 0.40 | 0.44 | 2.5 |
| Turbidity after 4 days at 50° C. (NTU) | 0.18 | 0.19 | 0.3 | 0.43 | 0.38 | 0.42 | 6.8 | 60 | >200 |
| Turbidity after 7 days at 50° C. (NTU) | 0.19 | 0.26 | 0.31 | 1.04 | 0.88 | 0.73 | 12.5 | >200 | >200 |

The limit for detection with the naked eye of turbidity in a composition is set at 1 NTU. As shown in TABLE 6, the turbidity of compositions 10 to 15 never exceeds 1 NTU. There are no deposits visible to the eye for compositions 10 to 15 and we can therefore consider that compositions 10 to 15 are stable. However, compositions 16 and 18 exceed the limit of 1 NTU after 4 days or even a single day in the case of composition 18. Compositions 16, 17 and 18 quickly present turbidity and are therefore absolutely not stable.

TABLE 7 summarizes the results of the coloration test in example 3, the precipitation test in example 4 and the trialkyl phosphite/total phosphite molar ratio for compositions A to I which were used to prepare compositions 1 to 14. For the yellowing test, beyond 50 Hazen measured at a maximum 5 days at 90° C., the coloration of the composition is considered as too high and therefore the test fails (fail). Below this value, the test is successful (pass). For the precipitation test, beyond the limit set of 1 NTU at maximum 7 days at 50° C., the precipitation of the composition is considered as too visible and the test fails (fail), in the contrary case the test is validated (pass).

TABLE 7

| Compositions | Yellowing test by composition | Precipitation test by composition | Trialkyl phosphite/total phosphite molar ratio |
|---|---|---|---|
| A | 1: fail | 10: pass | / |
| B | 2: pass | 11: pass | 1.5 |
| C | 3: pass | 12: pass | 2.8 |
| D | 4: pass | 13: pass | 6.5 |
| E | 5: pass | 14: pass | 10.3 |
| F | 6: pass | 15: pass | 14.2 |
| G (comparative) | 7: pass | 16: fail | 18.2 |
| H (comparative) | 8: pass | 17: fail | 24.6 |
| I (comparative) | 9: pass | 18: fail | 94.3 |

Compositions B to F validate both tests simultaneously, which is not the case for compositions A, G, H and I. These compositions B to F are characterized by a trialkyl phosphite/total phosphite molar ratio lower than 15%.

The invention claimed is:

1. A polyisocyanate composition comprising:
a) at least one polyisocyanate with the general formula (I): O=C=N—Y—(N=C=O)n wherein:
Y is the remainder of an isocyanate or a polyisocyanate after elimination of an isocyanate function wherein Y is a group: linear or branched alkyl comprising 2 to 15 atoms of carbon, cycloalkyl comprising 3 to 15 atoms of carbon, linear or branched alkyl comprising 2 to 12 atoms of carbon, cycloalkyl comprising 3 to 12 atoms of carbon, linear or branched alkyl comprising 4 to 10 atoms of carbon, or cycloalkyl comprising 4 to 10 atoms of carbon; and
n is at least equal to 1,
b) a monophenol alkyl compound, wherein the monophenol alkyl compound comprises a hindered phenol or hindered thiophenol function,
c) a mixture of phosphite compounds comprising a maximum of 17% of trialkyl phosphite moles in relation to the total phosphite moles,
d) a cross-linking catalyst and
e) additives.

2. The composition according to claim 1 wherein the trialkylphosphites are compounds according to the general formula (II): $(R_1O)_3P$ wherein each $R_1$ independently represents an alkyl group of 1 to 20 atoms of carbon optionally substituted by a group containing a halogen or an aralkyl group of 5 to 20 atoms of carbon substituted by a group containing a halogen.

3. The composition according to claim 1 wherein the mixture of phosphite compounds comprises 15% maximum of trialkyl phosphite moles in relation to the total phosphite moles.

4. The composition according to claim 1 wherein the cross-linking catalyst comprises a tertiary amine, an amidine, an organo-metallic compound or a mixture thereof.

5. The composition according to claim 1 wherein the additives added are solvents, compounds with an anti-flocculant effect and/or humidity absorbers.

6. The composition according to claim 1 wherein the compounds are present in the following mass percentages:
general formula (I) polyisocyanate between 97.9% and 99.98%,
monophenol alkyl compound between 0.01% and 1%
phosphite compound mixture 0.01% and 1%
cross-linking catalyst between 0% and 0.1%.

7. The composition according to claim 1 wherein the compounds are present in the following mass percentages:
general formula (I) polyisocyanate between 20% and 90%,
monophenol alkyl compound between 0.01% and 1%
phosphite compound mixture 0.01% and 1%
cross-linking catalyst between 0% and 0.1%
additives between 9.98% and 77.9%.

8. The composition preparation process according to claim 1 wherein the following compounds are mixed in any order:
a) a polyisocyanate with the general formula (I): O=C=N—Y—(N=C=O)n wherein:
Y is a group: linear or branched alkyl comprising 2 to 15 atoms of carbon, cycloalkyl comprising 3 to 15 atoms of carbon, linear or branched alkyl comprising 2 to 12 atoms of carbon, cycloalkyl comprising 3 to 12 atoms of carbon, linear or branched alkyl comprising 4 to 10 atoms of carbon, or cycloalkyl comprising 4 to 10 atoms of carbon; and n is at least equal to 1, b) a monophenol alkyl compound, c) a mixture of phosphite compounds comprising a maximum of 17% of trialkyl phosphite moles in relation to the total phosphite moles, d) a cross-linking catalyst and e) additives.

9. The composition preparation process according to claim 8 adapted to manufacture coatings, adhesives or paints.

10. A method for manufacturing coatings, adhesives or paints comprising the implementation of the composition according to claim 1.

* * * * *